3,532,601
FERMENTATIVE PREPARATION OF THREONINE
Shinji Okumura, Masao Shibuya, and Fumihiro Yoshinaga, Kanagawa-ken, Kazuo Komagata, Tokyo, and Norobu Katsuya, Kanagawa-ken, Japan, assignors to Ajinomoto Co., Inc., Tokyo, Japan
No Drawing. Continuation-in-part of application Ser. No. 550,126, May 16, 1966. This application July 31, 1969, Ser. No. 846,604
Claims priority, application Japan, May 18, 1965, 40/28,815
Int. Cl. C12d 13/06
U.S. Cl. 195—29     4 Claims

ABSTRACT OF THE DISCLOSURE

When certain strains of Pseudomonas and Achromobacter are cultured on an otherwise conventional medium containing L-homoserine, L-threonine accumulates in the culture medium.

REFERENCE TO RELATED APPLICATION

This is a continuation-in-part of our copending application Ser. No. 550,126, filed May 16, 1966, and now abandoned.

This invention relates to the manufacture of optically active threonine, and particularly to a method of preparing threonine by fermentation.

The object of the invention is the production of threonine at low cost from readily available raw materials.

L-threonine is one of the amino acids essential for animal nutrition and is known to be an intermediate in the biochemical synthesis of isoleucine. It has, therefore, found applications in medical research, as an intermediate in the production of other compounds valuable to biochemists, and as a food additive. It has been disclosed in U.S. Pat. No. 3,099,604 that certain microorganisms produce L-threonine in a culture medium containing L-homoserine.

We have found that a large amount of L-threonine is produced when certain microorganisms of the genera Pseudomonas or Achromobacter are cultured in a medium containing homoserine. The quantity of L-threonine accumulated in the medium may be as high as 2 grams per deciliter under favorable conditions. The yield of L-threonine, based on homoserine may be more than 80 percent, and 20 percent based on carbohydrate added to the medium. The fermentation is completed within 72 hours.

The microorganisms employed in the present method are available from stock cultures of public research institutions and are also found in nature. The following microorganisms have been used succcessively: *Pseudomonas trifolii* IAM 1545, *Pseudomonas perlurida* IAM 1600, *Pseudomonas perlurida* IAM 1627, *Pseudomonas lacunogenes* IAM 1568, *Pseudomonas cinnamona* IAM 1532, *Pseudomonas stutzeri* IAM 1476, *Pseudomonas stutzeri* IAM 1486, *Pseudomonas ovalis* IAM 1236, *Achromobacter delicatulus* IAM 1433, and Achromobacter specie strain No. 2669.

The species identified by IAM numbers are stock cultures available from the Institute of Applied Microbiology, Tokyo University, Japan, but Achromobacter species No. 2669 is a new species which has been isolated from sewage.

The characteristic properties of Achromobacter species No. 2669 are as follows:

Shape and motility:
Rods, 0.6 by 1.2 to 1.8 microns. Occurring singly, or in pairs.
None-motile. Gram negative. Spore not formed.

Nutrient agar colonies: Circular, smooth, entire, raised, glistening, pale yellowish brown, opalescent, butyrous.
Nutrient agar slant: Growth moderate, filiform, flat, glistening, pale yellowish brown, opalescent, butyrous.
Nutrient broth: Turbid.
Nutrient gelatin stab: No liquefaction.
Milk: Chocolate color.
B.C.P. milk: Acid, then turns to chocolate color.
Nitrite: Produced from nitrate in nitrate broth.
Nitrate respiration: Negative.
M.R. test: Positive.
Indole: Not produced.
V-P test: Positive.
Starch: Not hydrolyzed.
Gas and acid from carbohydrates:
Acid but no gas is produced, aerobically and anaerobically, from glycerol, glucose, fructose, sucrose, maltose and lactose according to Hugh and Leifson's method. No acid and gas from xylose, arabinose and starch.
Reducing substance is not produced from gluconate. Glucose, gluconate, citrate and succinate are utilized as a sole carbon source with ammonical nitrogen. Benzoate, salicylate, m-hydroxy-benzoate, p-hydroxy-benzoate, protocatechuate, gentisate and anthranilate are not utilized.
Cytochrome oxidase: Negative.
Catalase: Positive.
Source: Sewage.

The isolates resemble those of *Aerobacter aerogenes* in respect to anaerobic production of acid from various carbohydrates and tests of M.R. and V–P, but differ in respect to ability of nitrate respiration, no production of gas from carbohydrates and chocolate color coloration of milk. This microorganism is therefore considered a new species belonging to the genus Achromobacter.

The medium employed for the presetnt method is basically conventional and contains assimilable source of carbon and nitrogen together with certain growth promoting substances and inorganic ions. Glucose is a desirable carbon source and other carbohydrates and derivatives thereof, including organic acids and alcohols, may also be employed. Their concentration in the culture medium is normally between 3 and 13% by weight based on glucose equivalents.

The nitrogen source which has a direct influence on the propagation of the microorganisms and the production of L-threonine may be ammonia added as a gas or as an aqueous solution, or an inorganic or organic nitrogen compound.

The nature of the nitrogen source and its concentration in the medium must be selected and controlled properly according to the microorganism employed in order to get best results. For example, when Achromobacter species No. 2669 is used, ammonium nitrate is a more beneficial nitrogen source than ammonium sulfate, ammonium chloride, or urea. In general, the concentration of then nitrogen source in the culture medium should be between 0.5 and 3% by weight.

Inorganic addition agents include phosphate, salts of magnesium, iron, and manganese, as is conventional.

The growth promoting agents, known in themselves, which are preferably added include vitamins, amino acids, soy bean protein hydrolyzate, yeast extract, corn steep liquor, and the like.

Homoserine may be added to the medium as homoserine-bearing culture solution obtained by fermentation or a concentrate thereof, or as pure L-homoserine. L-homoserine, DL-homoserine, or mixtures of D- and L-homoserine may be used in a concentration in the culture medium between 0.5 and 4% by weight.

The full amount of homoserine may be added to the medium, at the beginning of fermentation, or a part is added at the beginning, and the remainder during fermentation.

The fermentation is carried out under aerobic conditions obtained by shaking or by aeration and agitation to expose the nutrient medium to oxygen.

For best results, the hydrogen ion concentration in the culture medium should be controlled between pH 6.0 and 8.0. When the pH of the medium increases beyond 8, it may be adjusted by addition of acids such as hydrochloric or sulfuric acid. If the pH decreases below 6.0, it may be adjusted by means of calcium carbonate, ammonia, caustic soda, caustic potash, or other alkalinzing agents.

The preferred cultivating temperature is between 25° and 38° C. The fermentation is normally completed within less than 72 hours, and L-threonine is recovered from the culture solution by well known procedures.

The following examples further illustrate the invention.

Example 1

A culture medium was prepared to the following composition:

Glucose—5%
Ammonium sulfate—2%
Potassium dihydrogen phosphate—0.1%
Magnesium sulfate-heptahydrate—0.04%
Iron ion—2 p.p.m.
Manganese ion—2 p.p.m.
L-homoserine—1%
Ajieki (brand name of soybean protein hydrolyzate, total nitrogen 2.2 g./dl.)—3 ml./dl.
Yeast extract (powder)—0.1%
Calcium carbonate (sterilized separately)—5%

20 milliliter batches of the above-mentioned medium were placed in 500 ml. shaking flasks, and were sterilized by steam in the flasks at 110° C. for 5 minutes.

*Pseudomonas stutzeri* IAM 1486 was inoculated on this fermentation medium and cultivated under aerobic condition at 31° C. for 48 hours, whereupon the amount of L-threonine in the culture medium was 0.81 g./dl. (determined by microbiological assay).

The microbial cells were separated from the broth by filtration, and the filtrate was passed over a column packed with a cation exchange resin of the H-type after removing ammonium and carbonic acid. One liter of broth which had contained 8.1 grams threonine yielded 5.8 grams pure L-threonine in crystalline form.

Example 2

A culture medium was prepared to the following composition:

Glucose—8%
Ammonium sulfate—2.5%
Potassium dihydrogen phosphate—0.3%
Magnesium sulfate-heptahydrate—0.04%
Iron ion—2 p.p.m.
Manganese ion—2 p.p.m.
Ajieki—3 ml./dl.
Calcium carbonate (sterilized separately)—5%

The medium was sterilized as described in Example 1, inoculated with *Pseudomonas stutzeri* IAM 1486 and cultivated under aerobic conditions at 31° C. L-homoserine was added to the medium after 24 hours cultivation so that the concentration was 1%, and the fermentation was continued for 48 hours, when the amount of L-threonine in the culture broth was 1.76 g./dl. The broth could be used as feed supplement without isolation of the L-threonine.

Example 3

*Pseudomonas perlurida* IAM 1627 was inoculated on the same medium as in Example 2, and was cultivated under aerobic conditions at 31° C. DL-homoserine was added to the medium in equal batches at the beginning of fermentation, after 24, 36, and 48 hours so that the total amount of added L-homoserine was 2%. The fermentation was terminated after 72 hours and the amount of L-threonine accumulated in the culture medium was 0.79 g./dl. The yield of L-threonine from L-homoserine was 79%.

Example 4

*Pseudomonas trifolii* IAM 1545 was inoculated on the same medium as in Example 2, and was cultivated under aerobic conditions at 31° C. L-homoserine was added to the medium in equal parts totaling 2% at the beginning mentation was terminated after 72 hours and the amount of L-threonine in the culture medium after 72 hours was 1.38 g./dl.

Example 5

*Pseudomonas lacumogenes* IAM 1586 was inoculated on the same medium as in Example 2, and was cultivated under the condition mentioned in Example 4. The amount of L-threonine accumulated in the culture medium after 72 hours was 1.02 g./dl.

*Pseudomonas cinnamona* IAM 1532, *Pseudomonas ovalis* IAM 1236, and *Achromobacter delicatulus* IAM 1433 yielded 1.65, 0.70, and 0.45 g./dl. L-threonine respectively under the same conditions.

Example 6

Achromobacter species strain No. 2269 (ATCC No. 19552) was inoculated on a medium which differed from that described in Example 2 by containing 1.5% ammonium nitrate instead of ammonium sulfate, and was cultivated under the same conditions as in Example 4. The amount of L-threonine accumulated in the culture medium after 72 hours fermentation was 1.46 g./dl.

What we claim:

1. A method of preparing L-threonine by fermentation which comprises culturing a microorganism selected from the group consisting of *Pseudomonas trifolii* IAM 1545, *Pseudomonas perlurida* IAM 1600, *Pseudomonas perlurida* IAM 1627, *Pseudomonas lacunogenes* IAM 1568, *Pseudomonas cinnamona* IAM 1532, *Pseudomonas stutzeri* IAM 1476, *Pseudomonas stutzeri* IAM 1486, *Pseudomonas ovalis* IAM 1236, *Achromobacter delicatulus* IAM 1433, and Achromobacter species No. 2669 (ATCC No. 19552) at pH 6–8 in a culture medium containing an assimilable carbon source, an assimilable nitrogen source, inorganic salts, and L-homoserine until L-threonine accumulates in the medium.

2. A method as set forth in claim 1, wherein said microorganism is Achromobacter species No. 2669 (ATCC No. 19552).

3. A method as set forth in claim 1, wherein said homoserine is incorporated in said culture medium in an amount of 0.5% to 4% by weight based on the weight of the culture medium, at least a portion of said homoserine being added during said culturing.

4. A method as set forth in claim 1, which further comprises recovering said L-threonine from said medium.

References Cited

UNITED STATES PATENTS

| 3,099,604 | 6/1963 | Kinoshita et al. | 195—29 |
| 3,133,868 | 5/1964 | Takesue et al. | 195—30 |
| 3,375,173 | 3/1968 | Nishimura et al. | 195—29 |

LIONEL M. SHAPIRO, Primary Examiner